United States Patent [19]
Toriumi et al.

[11] Patent Number: 5,260,897
[45] Date of Patent: Nov. 9, 1993

[54] SIGNAL PROCESSING CIRCUIT

[75] Inventors: Yoshitaka Toriumi; Akio Yoshida, both of Tokyo, Japan

[73] Assignee: NEC Corporation, Tokyo, Japan

[21] Appl. No.: 783,907

[22] Filed: Oct. 29, 1991

[30] Foreign Application Priority Data

Oct. 31, 1990 [JP] Japan .................... 2-296080

[51] Int. Cl.[5] .................................................. G06F 7/00
[52] U.S. Cl. ............................................................. 364/736
[58] Field of Search .................... 364/736, 748, 754; 395/800

[56] References Cited

U.S. PATENT DOCUMENTS

| | | | |
|---|---|---|---|
| 4,825,359 | 4/1989 | Ohkami et al. | 364/736 |
| 4,852,048 | 7/1989 | Morton | 395/800 |
| 4,901,267 | 2/1990 | Birman et al. | 364/736 |
| 4,996,661 | 2/1991 | Cox et al. | 364/736 |
| 5,113,523 | 5/1992 | Colley et al. | 364/736 |
| 5,129,092 | 7/1992 | Wilson | 395/800 |
| 5,136,717 | 8/1992 | Morley et al. | 395/800 |

Primary Examiner—Long T. Nguyen
Attorney, Agent, or Firm—Whitham & Marhoefer

[57] ABSTRACT

A signal processing circuit includes an instruction memory for storing arithmetic instructions, an instruction decoder for decoding the instructions read from the instruction memory, an arithmetic circuit for carrying out arithmetic process in accordance with the instructions decoded by the instruction decoder, data memory for storing data to be processed by the arithmetic circuit, and a multi-port type register for storing data read from the data memory and the results of the arithmetic results. In the signal processing circuit, arithmetic processes in the arithmetic circuit are carried out in parallel by transferring data between the multi-port type register and the arithmetic circuit in accordance with one instruction.

4 Claims, 6 Drawing Sheets $x' = a(x + y)$ $y' = a(x - y)$ $x' = ax + by$ $y' = ax - by$ $x' = x + y$ $y' = x - y$

SIGNAL PROCESSING CIRCUIT

FIELD OF THE INVENTION

This invention relates to a signal processing circuit, and more particularly to, a signal processing circuit for data compression process of motion pictures in a display.

BACKGROUND OF THE INVENTION

In a signal processing circuit for data compression process of motion pictures in a display, the data of motion pictures are compressed to be coded. Usually, continual frame data of motion pictures have intensive correlations, so that one of the data compression processes uses differences between two continual flame data as motion picture information. In more detail, the rear emotion compensation process and dispersive cosine translation (DCT) process in the data compression process.

In the motion compensation process, moving objects in one frame are detected, and amounts of the moving paths thereof between the continuous frames are calculated to be coded, and then the differences of amounts of the moving paths thereof are calculated to be used as motion picture information. The motion picture information is obtained by the following formula:

$$\Sigma |X_j - Y_k| \quad (1)$$

where $X_j$ and $Y_k$ are pixel data of the present and previous frames, respectively.

In the DCT process the frame data are transformed to be frequency components to be motion picture information obtained by the following formula:

$$\Sigma X_j Y_k \quad (2)$$

In addition, there is another process of the DCT process called as fast cosine transformation (FCT) process. In the FCT process, butterfly arithmetic processes are carried out.

If there is little correlation between continuous frames, an inner and inter frame adaptation forecast process is used. The inner and inter frame adaptation forecast process is obtained by the following formula:

$$\Sigma (X_j - Y_k)^2 \quad (3)$$

A first conventional signal processing circuit includes a data memory, a program memory, a register, first to third selecting circuits,- a multiplier, a shift register, an arithmetic circuit (an arithmetic logic unit), an accumulator, and a parallel logic unit.

In operation, data are supplied to the multiplier from a first data bus and the first selecting circuit connected with a second data bus, and arithmetic process of the supplied data is carried out. The result of the arithmetic process is supplied to the accumulator in which accumulation process is carried out. The result of the accumulation process is supplied to the first data bus, the arithmetic circuit and the second selecting circuit. On the other hand, the following arithmetic process is carried out independently with the above mentioned arithmetic process. Data for one arithmetic process stored in the data memory 4 are stored temporally in the register. The third selecting circuit selectively supplies the parallel logic unit with either the content of the register or that of the second data bus supplied from the program memory. The parallel logic unit 10 supplies the data memory through the first data bus with both an output of the third selecting circuit and the content of the data memory. Desired picture arithmetic processes are carried out by repeating such processes above mentioned.

A second conventional signal processing circuit includes a data memory, a multiplier, an arithmetic circuit (an arithmetic logic unit), an accumulator, a register and a barrel shifter.

In operation, data stored in the data memory are supplied to the barrel shifter, the arithmetic circuit and the multiplier in parallel through first and second data buses. Then, predetermined arithmetic processes are carried out respectively, and the results are stored in the register. The contents of the register are supplied to both the accumulator and a third data bus. Such series of processes are carried out simultaneously at either pair of the accumulator and the barrel shifter, the accumulator and the arithmetic circuit, and the accumulator and the multiplier, by conducting one instruction.

According to the conventional signal processing circuits, however, there is a disadvantage in that it takes a lot of steps to carry out arithmetic processes. In the first conventional signal processing circuit, it is impossible to carry out arithmetic processes of the motion compensation process and the inner and inter adaptation forecast by one instruction. In the second conventional signal processing circuit, data are rewritten to a data memory in each time after the arithmetic process, so that it takes more steps corresponding to data accessing to the data memory.

SUMMARY OF THE INVENTION

Accordingly, it is an object of the invention to provide a signal processing circuit in which it takes smaller number of steps in arithmetic processes as compared with conventional signal processing circuits.

According to a feature of the invention, a signal processing circuit comprises:

means for storing instructions of arithmetic processes;
means for decoding the instructions stored in the instruction storing means;
means for storing data;
means for carrying out a calculation of the data read from the data storing means in accordance with the instructions decoded by the decoding means; and
a multi-port type register circuit connected to the data storing means and the calculation means to store the read data and results of the arithmetic process temporally.

BRIEF DESCRIPTION OF THE DRAWINGS

The invention will be explained in more detail in conjunction with appended drawings wherein.

DESCRIPTION OF THE PREFERRED EMBODIMENTS

Before describing a signal processing circuit in preferred embodiments according to the invention, the conventional signal processing circuit described before will be explained.

Figure 1A:
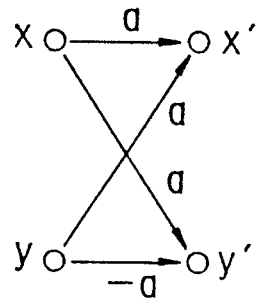
FIGS. 1A to 1C are explanation views of butterfly arithmetic process in FCT.
Figure 1B:
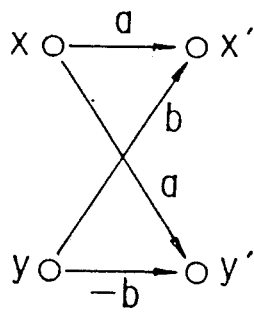
Figure 1C:
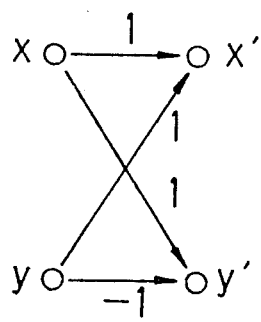

FIGS. 1A to 1C show butterfly arithmetic process in the FCT process.

Figure 2:
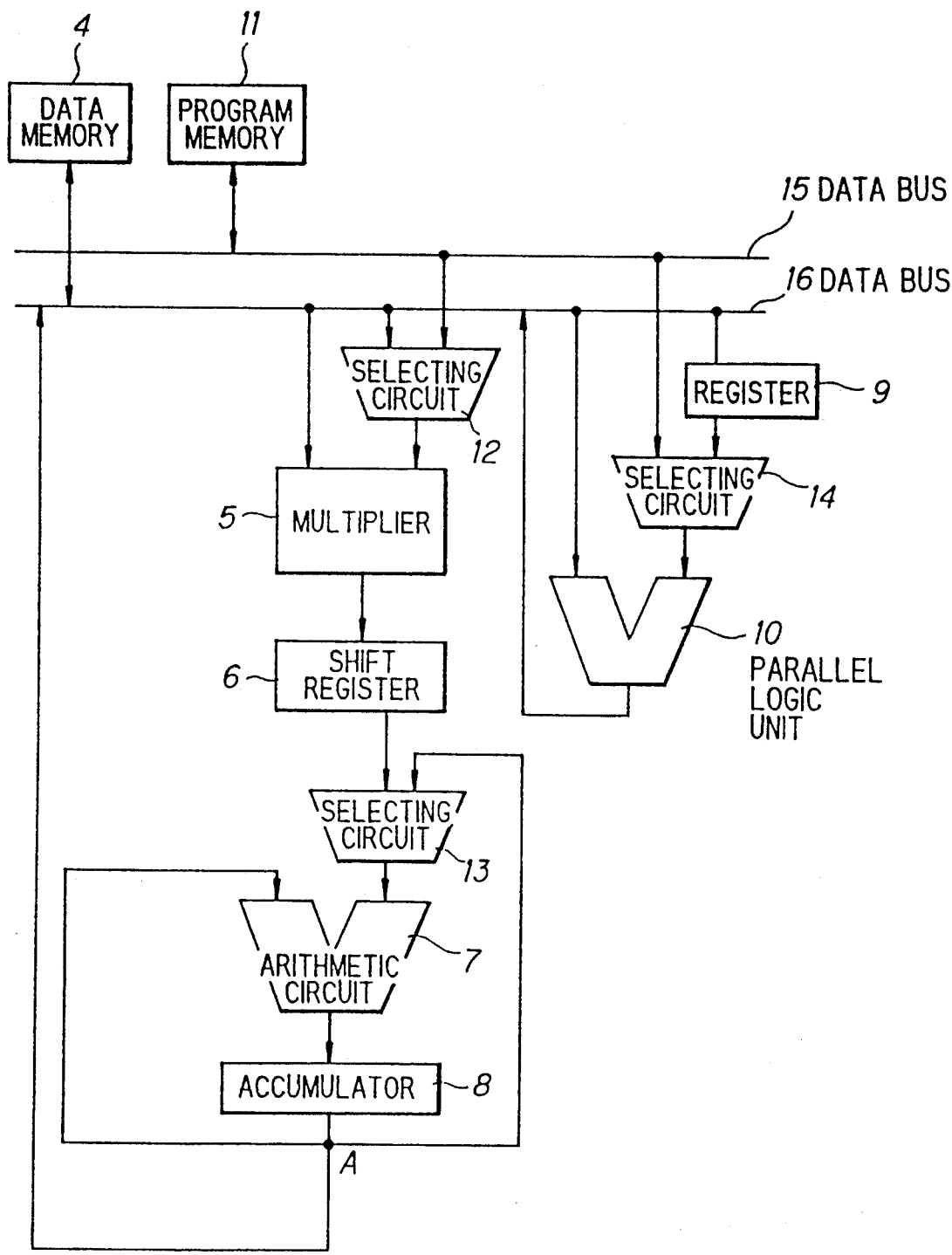
FIG. 2 is a block diagram of a first conventional signal processing circuit.

FIG. 2 shows the first conventional signal processing circuit. The signal processing circuit includes a data memory 4 for storing pixel data of picture flames connected with a data bus 16, a program memory 11 for storing programs connected with a data bus 15, a register 9 connected with the data bus 16, a selecting circuit 12 which selectively supplies an output signal from data of the data buses 15 and 16, a multiplier 5 which multiplies the data of the data bus 16 by the output of the selecting circuit 12, a shift register 6 which shifts the output of the multiplier 5, a selecting circuit 13 which selectively supplies an output signal from the output of the shift register 6 and an accumulator 8 which will be mentioned after, an arithmetic circuit (an arithmetic logic unit) 7 which carries out arithmetic operation of an output of the selecting circuit 13 and an output of the accumulator 8, the accumulator 8 which accumulates an output of the arithmetic circuit 7 and supplies an output signal to the data bus 16, a register 9 which temporally stores data of the data bus 16, a selecting circuit 14 which selectively supplies an output signal from an output of the register 9 and the data of the data bus 15, and a parallel logic unit 10 which supplies both an output of the selecting circuit 14 and the data of the data bus 16 in parallel to the data bus 16.

Figure 3:
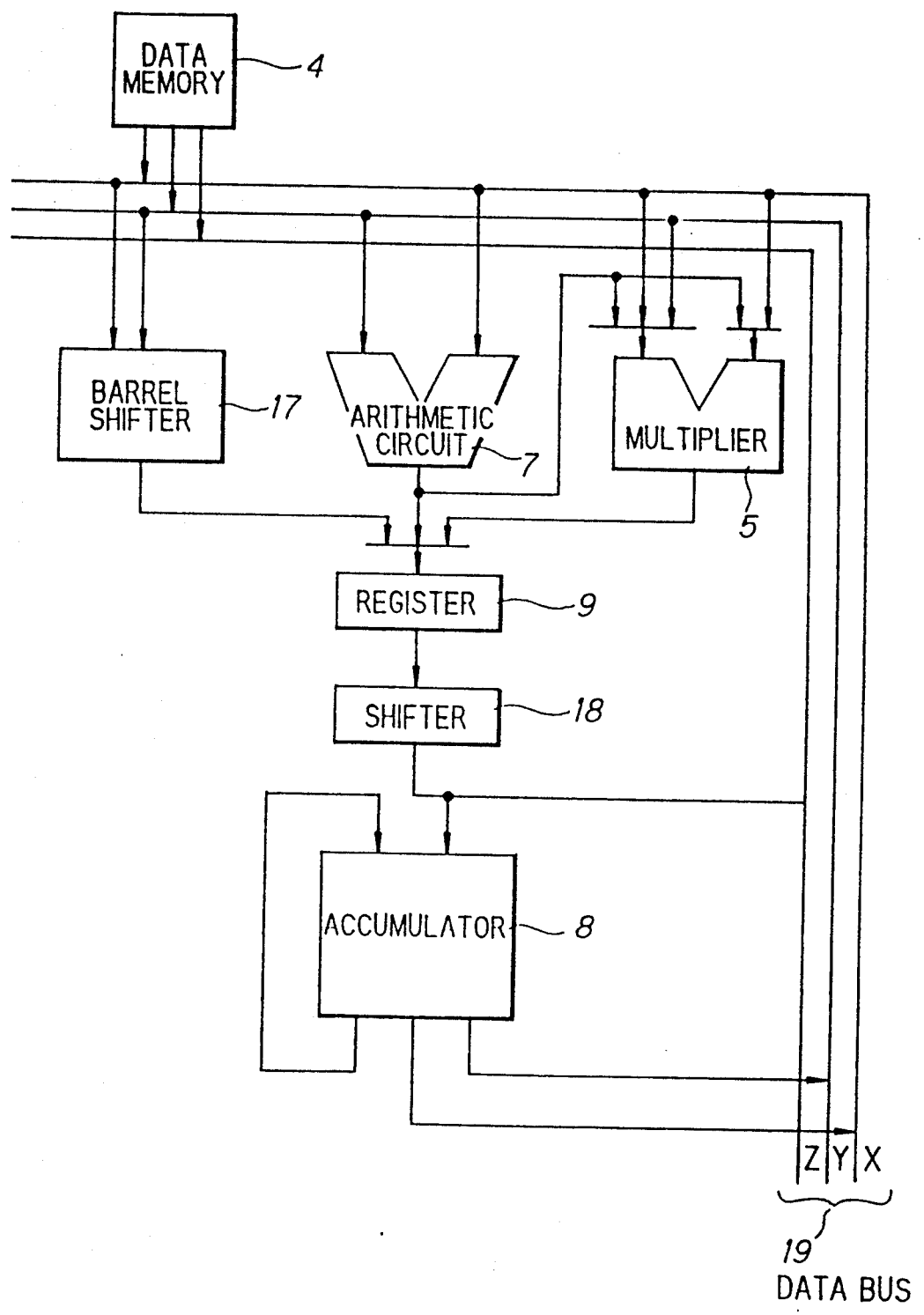
FIG. 3 is a block diagram of a second conventional signal processing circuit.

FIG. 3 shows the second conventional signal processing circuit. The signal processing circuit includes a data memory 4 connected with data buses X and Y of data bus 19, an arithmetic circuit 7 which carries out arithmetic operation of the data of the data buses X and Y, and a multiplier 5 which multiplies a first input signal from the buses X and Y and an output of the arithmetic circuit 7 by a second input signal from the bus X and the output of the arithmetic circuit 7 a barrel shifter 17 connected to the buses X and Y, a register 9 supplied with a signal from the multiplier 5, the arithmetic circuit 7 and the barrel shifter 17, a shifter 18 having an input connected to an output of the register 9 and an output connected to a bus Z of the bus 19, and an accumulator 8 having a first input connected to the output of the shifter 18, and a second input connected to one of three output, the remaining two outputs of which are connected to the buses X and Y.

Operations of the first and second conventional signal processing circuits have been explained before, so that the operation thereof is not explained again.

Figure 4:
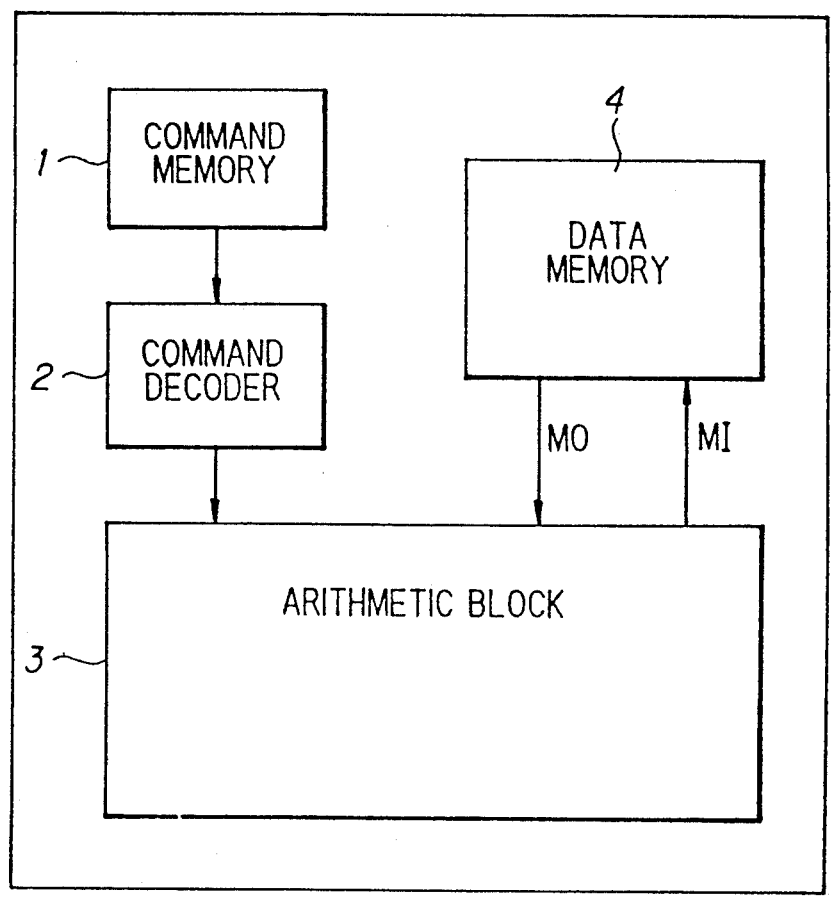
FIG. 4 is a block diagram of a signal processing circuit in a first preferred embodiment according to the invention.

Next, a signal processing circuit in a first preferred embodiment will be explained. As shown in FIG. 4, the signal processing circuit includes a instruction memory 1 for storing instructions of the program, a instruction decoder 2 which decodes the instructions supplied from the instruction memory 1, an arithmetic block 3 which carries out arithmetic process in accordance with the instruction supplied from the instruction decoder 2, and a data memory 4 for storing data.

Figure 5:
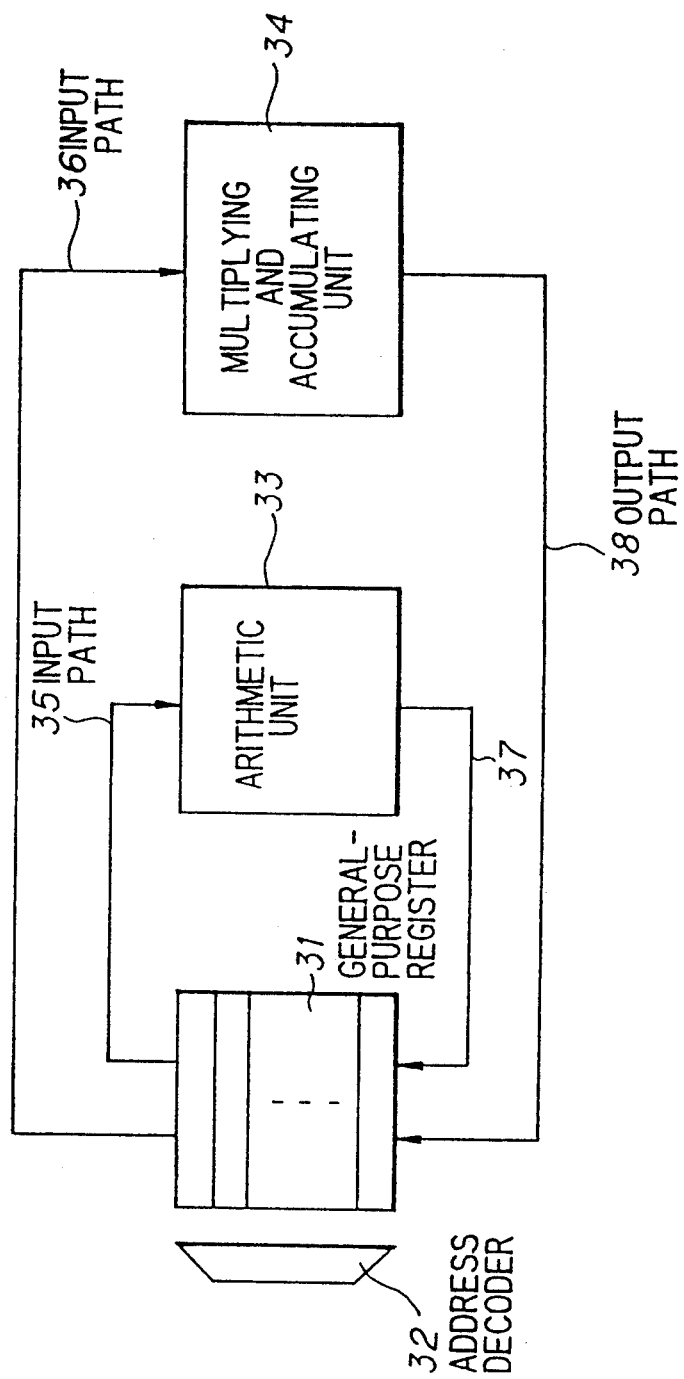
FIG. 5 is a block diagram of an arithmetic block of the signal processing circuit in the first preferred embodiment according to the invention.
Figure 6:
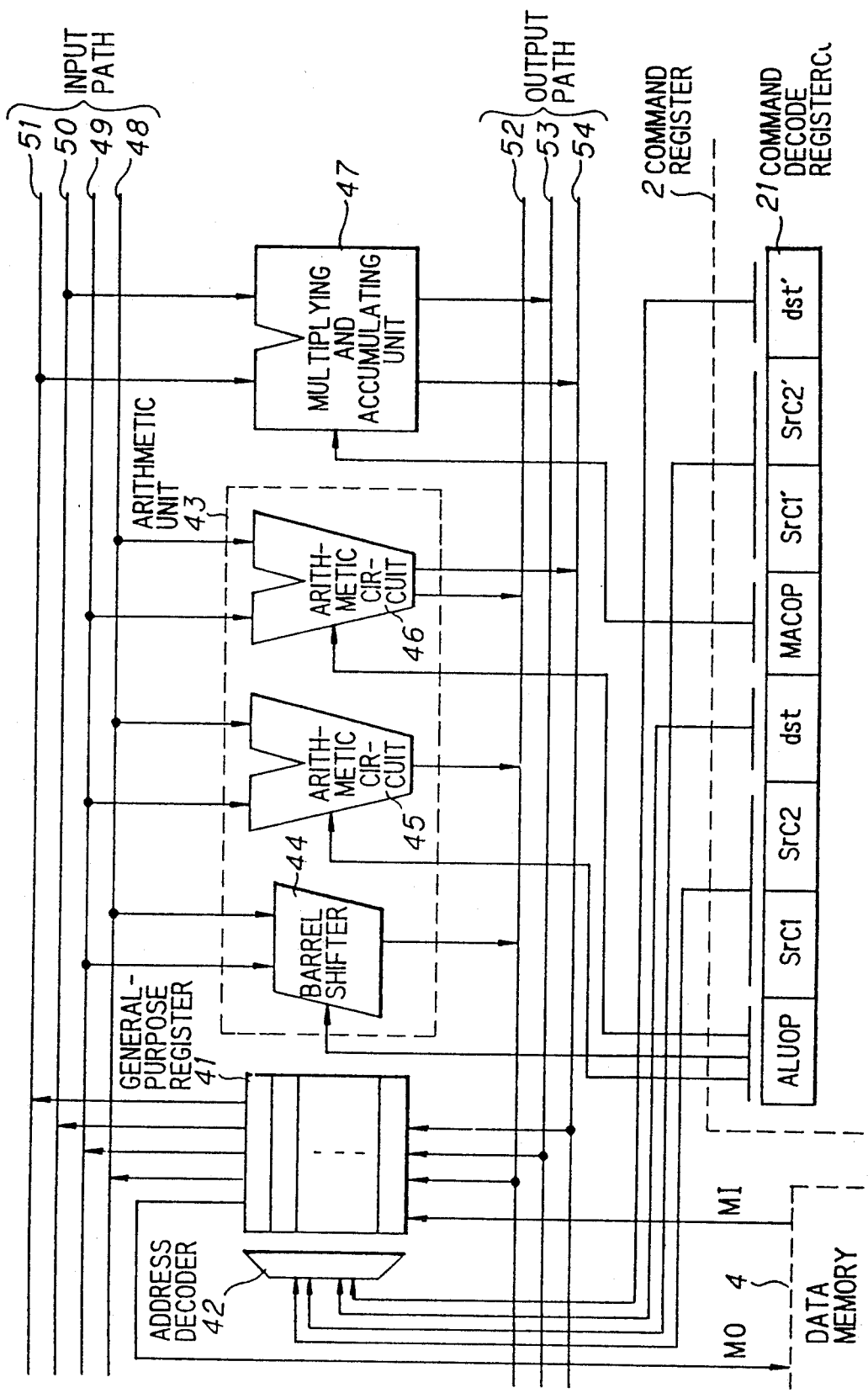
FIG. 6 is a block diagram of an arithmetic block of a signal processing circuit in a second preferred embodiment according to the invention.

FIG. 5 shows a detail block structure of the arithmetic block 3 of the signal processing circuit shown in FIG. 4. The arithmetic block 3 includes a general-purpose register 31 of multi-port type including a plurality of registers, an address decoder 32, an arithmetic logic unit 33, a multiplying and accumulating unit 34, input paths 35 and 36 from the register 31 to the units 33 and 34, and output paths 37 and 38 from the units 33 and 34 to the register 31.

In operation, a instruction is read from the instruction memory 1 and decoded by the instruction decoder 2 to be supplied to the arithmetic block 3. In the arithmetic block 3, data are read from the data memory 4 through an output path MO of the data memory 4 to be stored to the general-purpose register 31. Each data is stored in a corresponding register of the general-purpose register in accordance with a corresponding address designated by the address decoder 32. Then, the data are transmitted to the arithmetic unit 33 and the multiplying and accumulating unit 34 through the input paths 35 and 36 respectively to carry out predetermined arithmetic processes which are ordered by the instruction. Then, the results of the arithmetic Process are transferred from the arithmetic unit 33 and the multiplying and accumulating unit 34 to the general-purpose register 31 through the output paths 37 and 38 respectively, and then written to the data memory 4 through an input path MI of the data memory 4.

Next, a signal processing circuit in a second preferred embodiment will be explained. The basic structure of the signal processing circuit in the second preferred embodiment is the same as that of the signal processing circuit in the first preferred embodiment, however, the structure of an arithmetic block thereof is explained in more detail in compared with that in the first preferred embodiment. The arithmetic block thereof includes a general-purpose register 41 of multi-port type, an address decoder 42, an arithmetic unit 43 including a barrel shifter 44 and two arithmetic circuits (two arithmetic logic units) 45 and 46, and a multiplying and accumulating unit 47. The general-purpose register 41 includes a plurality of single registers. The general-purpose register 41 is connected with the data memory 4 by input and output paths MI and MO through which data are read therefrom and written thereto. The general-purpose register 41 is connected with input paths 48 to 51 and output paths 52 to 54 through which the data are transferred from the general-purpose register 41 to the arithmetic unit 43 and the multiplying and accumulating unit 47. The address decoder 42 designates an address of a corresponding single register of the general-purpose register 41 in accordance with instructions stored in a instruction decode register 21 of the instruction decoder 2.

In operation, instruction stored in the instruction memory 1 are read therefrom to the instruction decoder 2. The instructions are decoded and stored in the instruction decode register 21 in the instruction decoder 2. Then, the instructions are transferred to the address decoder 42, the barrel shifter 44, the arithmetic circuits 45 and 46, and the multiplying and accumulating unit 47 in accordance with fields of the decoder register 21 to which the instructions belong.

After the transfer of the instructions, necessary data for arithmetic process are transferred from the data memory 4 to the general-purpose register 41 through the input path MI, and then transferred to the barrel shifter 44 and the arithmetic circuits 45 and 46 through the input paths 48 and 49 and to the multiplying and accumulating unit 47 through the input paths 50 and 51, and then predetermined arithmetic processes are carried out at each of the barrel shifter 44, the arithmetic circuits 45 and 46, and the multiplying and accumulating unit 47.

The results of the arithmetic processes are transferred to the general-purpose register 41 from the barrel shifter 44 through the output path 52, from the arithmetic circuits 45 and 46 through the output paths 52 and 54, and from the multiplying and accumulating unit 47 through the output paths 53 and 54, and then transmitted to the data memory 4 through the output path MO.

Next, calculations necessary for compression process of motion pictures will be explained.

First, operation of arithmetic process of picture motions in detail will be explained. First, the compensation process $\Sigma |X_j - Y_k|$ will be explained. In the first step, data $X_j$ and $Y_k$ are loaded from the data memory 4 to a register pair (sr1 and sr2) of the general-purpose register 41. In the second step, the data $X_j$ and $Y_k$ are transferred to the arithmetic circuits 45 and 46, and arithmetic processes of $(X_j - Y_k)$ and $(Y_k - X_j)$ are carried out respectively. Then, either one of $(X_j - Y_k)$ and $(Y_k - X_j)$ having a positive value is stored as a first arithmetic data in a register (dst) of the general-purpose register 41. In the third step, the first arithmetic data is transferred to the multiplying and accumulating unit 47, and accumulation process is carried out. The result of the compensation process $\Sigma |X_j - Y_k|$ can be obtained by carrying out the first to third steps repeatedly.

Second, the DCT process $\Sigma X_j Y_k$ will be explained. In the first step, data $X_j$ and $Y_k$ are loaded from the data memory 4 to a register pair (sr1' and sr2') of the general-purpose register 41. In the second step, the data $X_j$ and $Y_k$ are transferred to the multiplying and accumulating unit 47, in which multiplication of $X_j$ and $Y_k$ is carried out and the product of $X_j$ and $Y_k$ is accumulated. The result of the DCT process $\Sigma X_j Y_k$ can be obtained by carrying out the first and second steps repeatedly.

Third, the inner and inter frame adaptation forecast processed $\Sigma (X_j - Y_k)^2$ will be explained. In the first step, data $X_j$ and $Y_k$ are loaded from the data memory 4 to a register pair (sr1 and sr2) of the general-purpose register 41. In the second step, the data $X_j$ and $Y_k$ are transferred to the arithmetic circuit 45, and arithmetic process of $(X_j - Y_k)$ is carried out. Then, the result is stored as a first arithmetic data in a register (dst) of the general-purpose register 41. In the third step, the first arithmetic data is transferred to the multiplying and accumulating unit 47, and accumulation process is carried out. The result of the inner and inter frame adaptation forecast process $\Sigma (X_j - Y_k)^2$ can be obtained by carrying out the first to third steps repeatedly.

Finally, the FCT process will be explained. Here, the butterfly process shown in FIG. 1A will be explained as an example. In the first step, data (a) and (x) are loaded to a register pair (sr1' and sr2') of the general-purpose register 41 from the data memory 4. In the second step, the data (a) and (x) are transferred to the multiplying and accumulating unit 47, in which multiplication of (a) and (x) is carried out, and the product (a·x) is stored in a register (dst') of the general-purpose register 41. In the third step, data (y) is loaded to a register (sr2') of the general-purpose register 41 from the data memory 4. In the fourth step, the data (a) and (y) are transferred to the multiplying and accumulating unit 47, in which multiplication of (a) and (y) is carried out, and the product (a·y) is stored in a register (dst'') of the general-purpose register 41. In the fifth step, arithmetic process of (a·x + a·y) is carried out at the arithmetic circuit 45, and the result is stored in a register (dst) of the general-purpose register 41. In the sixth step, arithmetic process of (a·x − a·y) is carried out at the arithmetic circuit 46, and the result is stored in a register (dst) of the general-purpose register 41. In the seventh step, (a·x + a·Y) and (a·X − a·y) stored in the register (dst) are transferred to the data memory 4. Thus the results of the FCT process can be obtained. The process of FIGS. 1B and 1C will be carried out in the similar manner.

In the signal processing circuit in the first and second preferred embodiments, arithmetic processes in the arithmetic circuit and loading and accessing of data from the data memory are carried out in parallel by one instruction. Further, it is not necessary to rewrite the processed data in each time after arithmetic process in the FCT process, so that there is required smaller number of steps.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A signal processing circuit, comprising:
   means for storing instructions of arithmetic processes:
   means for decoding said instructions stored in said instruction storing means;
   means for storing data;
   means for carrying out a calculation of said data read from said data storing means in accordance with said instructions decoded by said decoding means;
   a multi-port type register circuit connected to said data storing means and said calculation means to store said read data and results of said arithmetic process temporally;
   said means for carrying out a calculation including at least two arithmetic logic units for carrying out arithmetic logic calculations of said data from said data storage means and a multiplying and accumulating circuit for carrying out multiplication and accumulation of said data from said data storage means, said at least two arithmetic logic units connected in parallel with said multi-port type register circuit; and
   means coupling said arithmetic logic units and said multiplying and accumulating circuit in parallel with said multi-port type register.

2. A signal processing circuit, according to claim 1, wherein:
   said at least two arithmetic logic units carry out different calculations by a common operated of said decoding means.

3. A signal processing circuit, comprising:
   means for storing instructions of arithmetic processes:
   means for decoding said instructions stored in said instruction storing means;
   means for storing data;
   means for carrying out a calculation of said data read from said data storing means in accordance with said instructions decoded by said decoding means;
   a multi-port type register circuit connected to said data storing means and said calculation means to store said read data and results of said arithmetic process temporarily;

said means for carrying out a calculation including at least two arithmetic logic units for carrying out arithmetic logic calculations of said data read from said data storage means and a multiplying and accumulating circuit for carrying out multiplication and accumulation of said data from said data storage means, said at least two arithmetic logic units connected in parallel with said multi-port type register circuit;

means coupling said arithmetic logic units and said multiplying and accumulating circuit in parallel with said multi-port type register; and a shift register circuit connected in parallel to said multi-port type register circuit and said arithmetic logic units and said multiplying and accumulating circuit.

4. A signal processing circuit, comprising:

a instruction memory for storing instructions of arithmetic processes;

an instruction decoder for decoding said instructions read from said instruction memory, said instruction decoder including decode registers for storing decoded instruction;

a data memory for storing data necessary for arithmetic processes;

a multi-port type register circuit for storing data read from said data memory and results of said arithmetic processes;

an address decoder for designating an address of said multi-port type register circuit by receiving said decoded instructions from said decode register;

first and second arithmetic logic units for carrying out arithmetic logic calculation of said data and said results supplied from said multi-port type register circuit, said first and second arithmetic logic units being connected in parallel to said multi-port type register circuit; and a multiplying and accumulating circuit for carrying out multiplication and accumulation of said data and said results supplied from said multi-port type register circuit, said multiplying and accumulating circuit being connected in parallel with said first and second arithmetic logic units to said multi-port type register circuit.

* * * * *